Feb. 13, 1968   B. R. ADELMAN   3,368,354
ROCKET MOTOR
Filed Dec. 18, 1963

INVENTOR.

United States Patent Office 3,368,354
Patented Feb. 13, 1968

3,368,354
ROCKET MOTOR
Barnet R. Adelman, Atherton, Calif., assignor to United Aircraft Corporation, East Hartford, Conn., a corporation of Delaware
Filed Dec. 18, 1963, Ser. No. 331,538
4 Claims. (Cl. 60—257)

This invention relates to an improvement in liquid propellant rocket motors and more particularly to a method for preventing combustion instability in large liquid rocket motors. Over the past decade a constantly reoccurring problem in the development of liquid rocket motors has been high frequency combustion instability. Although the problems of low frequency instability associated with the dynamics of propellant feed systems has been substantially solved, the problem of the aforementioned high frequency instability is not only unsolved, but the origin of the problem is not clearly understood. It has been observed, however, that the instability is not a continuous one for all levels of operation in a particular motor but is experienced at certain combinations of operating conditions. For example, the high frequency instability will be occasioned at a specific value of engine thrust and chamber pressure but will disappear upon slight modification of either variable. It is difficult to provide, therefore, a liquid motor having wide range throttling capabilities since a specific demand for a required maneuver may call for conditions establishing maximum instability. In some instances this would result in total destruction of the system.

In the past, several attempts have been made to attenuate these destructive vibrations set up by the high frequency instability but with only limited success. For instance, one approach has been to provide the combustion chamber with internal baffling which is believed to dampen the severe vibrations. However, this approach is not always successful and cannot be used in engines having substantial firing durations since the baffles erode away under the hostile, high-temperature conditions.

The present invention overcomes the above-mentioned disadvantages by injecting predetermined quantities of particulate matter into the high temperature gases present in the liquid engine combustion chamber. More specifically, the present invention calls for the use of a solid rocket motor mounted on the liquid engine whereby particle-laden combustion products of the solid motor pass directly into the liquid engine combustion chamber to abate all tendencies toward high frequency combustion instability therein.

It is an object, therefore, of the present invention to provide a novel combination solid and liquid propellant rocket motor.

It is a further object to provide a large liquid rocket motor that eliminates the complex and undesirable high frequency combustion instability.

It is still a further object to provide a large liquid motor having wide range throttling capabilities.

Other objects and advantages of the present invention will become apparent to those skilled in the art from the following discussion, appended claims and accompanying drawings in which:

Figure 1:
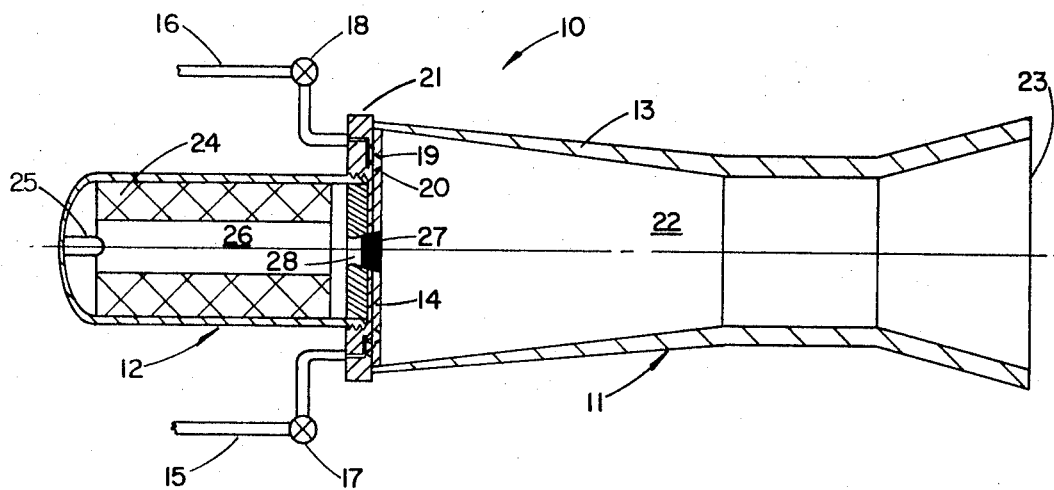
FIG. 1 is a side elevation view in cross-section showing a preferred embodiment of the combination solid-liquid propellant motor of this invention.

Referring now to the drawings in which like parts have been designated with like reference numerals and initially to FIG. 1, one embodiment of the novel combination rocket motor of this invention is illustrated and generally designated 10. Rocket motor 10 is comprised primarily of liquid motor 11 and solid motor 12 which are physically joined together in fluid communication through port 28. The liquid engine 11 is comprised of thrust chamber 13, injector 14 and propellant feed lines 15 and 16. Feed lines 15 and 16 are connected to fuel and oxidizer tanks respectively, not shown, whereupon control valves 17 and 18 meter the liquid propellants into the thrust chamber 13 via injection ports 19 and 20. The two streams of propellant impinge upon one another in the combustion chamber 22 whereupon they are ignited. The manifold 21 is provided with the necessary internal ducting to connect up the individual propellant ports such as 19 with the appropriate feed lines such as 16.

Once hot gases are generated by the combustion of the liquid fuel and oxidizer in the combustion chamber 22 of thrust chamber 13, they are expelled out nozzle 23 to provide thrust to the system. However, in the past it has been found that large liquid motors invariably suffer from high frequency vibrations set up during the course of operation which often results in destruction of the motor if not quickly corrected.

The present invention avoids the problem of high frequency combustion instability by introducing into the combustion chamber 22 solid particles on the order of 0.2–10 microns by means of a solid motor 12 containing specially loaded grain 24. In order to operate the solid-liquid motor of the present invention, one preferred mode of operation is to ignite the solid motor 12 by ignition means 25 whereupon pressure builds up in port area 26 to blow out closure 27. The particle-laden, high-temperature gases from the solid motor 12 then pass into combustion chamber 22 and out nozzle 23. Immediately after this, feed line valves 17 and 18 are opened to admit liquid propellant into the combustion chamber whereupon they ignite upon contact with the high temperature gases coming from the solid motor 12. The solid grain 24 is sized to contribute from one to twenty-five percent of the total amount of gas emerging from nozzle 23; however, the exact amount to be contributed by the solid motor will vary depending upon the relative instability of the liquid motor 22. This relationship can be readily controlled by controlling the nozzle area 28 of the solid motor and adjusting the burning rate of grain 24 with burning-rate accelerators.

In the event it is desired to fire the solid motor after the liquid engine has started, closure 27 will keep from igniting the solid grain prematurely. When this is the preferred mode of operation, appropriate ignition means must be provided in the combustion chamber 22 if the liquid propellants are not hypergolic.

An essential feature of the present invention revolves about the composition of the solid motor grain 24. This grain, comprised of a suitable binder such as PBAN (polybutadiene acrylonitrile) and oxidizer such as ammonium perchlorate, must be loaded with a suitable quantity of material which will provide the solid particulate matter of proper size to the liquid combustion chamber 22. It has been found that aluminum is a suitable material for loading the grain 24 as aluminum and its products of combustion such as aluminum oxide impart the desired vibration damping effect. For example, one preferred composition for a suitable grain 24 is comprised of 50 percent by weight of aluminum, 20 percent by weight of PBAN and 30 percent by weight of ammonium perchlorate. It is possible to vary the aluminum loading of the grain over a considerable range and still achieve the desired elimination of high frequency instability in the liquid motor. As low as 5 percent by weight aluminum may be employed in the grain with satisfactory results and even less in cases where the liquid engine's instability is slight.

Figure 2:
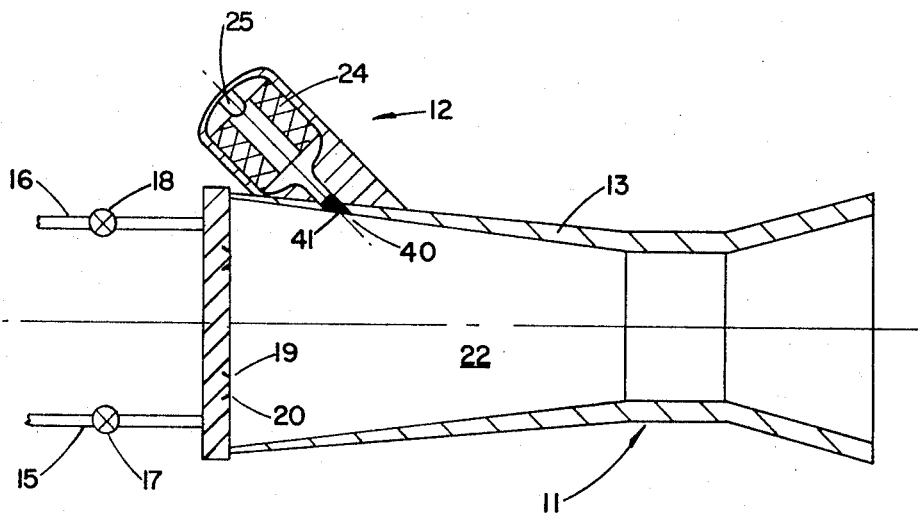
FIG. 2 is a side elevation view in cross-section of an alternative preferred embodiment of the combination solid-liquid motor of present invention.

In FIG. 2 is shown an alternative physical arrangement of the combination solid-liquid motor of the present invention. Again, a liquid engine thrust chamber 13 is provided with attendant propellant feed lines 15 and 16, valve 17 and 18 and manifold 14 with ports 19 and 20. However, instead of perforating the injector as in FIG. 1, the thrust chamber wall is provided with port 40 for fluid communication with solid motor 12. The principle of operation is the same as described above in connection with FIG. 1. Grain 24 is similarly loaded with particle-creating material such as aluminum as described above, causing the motor 12 to inject gases containing particulate-matter into the combustion chamber 22, thereby quelling any high frequency vibrations that may tend to occur.

It is obvious that specific design requirements may dictate placement of the solid motor 12 in a variety of positions on the thrust chamber or alternatively a plurality of solid motors may be placed in both the injector and the thrust chamber walls for certain applications.

In some instances it is possible to eliminate the ignition means 25 for the solid motor by leaving out closure plugs 27 or 41. The hot gases from the liquid motor will automatically act to ignite the grain 24 once the closure plugs 24 or 41 are eliminated.

Various modifications and alterations of this invention will become apparent to those skilled in the art without departing from the scope and spirit of this invention, and it is to be understood that the foregoing discussion and accompanying drawing set forth illustrative embodiments of this invention which are not to be unduly construed to limit this invention.

I claim:

1. In a liquid propellant rocket engine comprising a combustion chamber, a nozzle for discharging gases from said combustion chamber, means for supplying a fluid fuel to said combustion chamber, means for supplying a fluid oxidizer to said combustion chamber and means for varying the flow rates of said fluid fuel and fluid oxidizer whereby throttling of said liquid rocket engine over substantial thrust ranges can be obtained, the improvement which comprises means for reducing high frequency combustion instability in said liquid rocket engine, said means comprising a source of particles having a size of from 0.2 to 10 microns and means for introducing said particles into said combustion chamber.

2. The liquid rocket engine of claim 1 wherein said means for reducing high frequency combustion instability comprises a rocket motor in fluid communication with said combustion chamber, said rocket motor containing a propellant grain seeded with a particulate material, said grain producing on combustion a gaseous stream containing particles of from 0.2 to 10 microns in size.

3. The liquid rocket engine of claim 2 wherein said rocket motor is sized to produce from 1 to 25 percent of the gaseous product emerging from said combustion chamber.

4. The liquid rocket engine of claim 2 wherein said propellant grain comprises from 5 to 50 percent by weight of particulate aluminum.

References Cited

UNITED STATES PATENTS

| | | | |
|---|---|---|---|
| 2,671,312 | 3/1954 | Roy | 60—35.6 |
| 2,753,801 | 7/1956 | Cumming | 60—35.6 |
| 2,972,225 | 2/1961 | Cumming et al. | 60—35.6 |
| 3,022,735 | 2/1962 | Eberle | 60—35.6 |
| 3,144,751 | 8/1964 | Blackman et al. | 60—35.6 |
| 3,158,997 | 12/1964 | Blackman et al. | 60—35.6 |
| 3,204,560 | 9/1965 | Gustavson | 60—35.6 |

CARLTON R. CROYLE, *Primary Examiner.*

MARK NEWMAN, *Examiner.*

D. HART, *Assistant Examiner.*